Oct. 23, 1928.
A. E. QUANT
1,688,654
DISH WASHER
Filed Dec. 30, 1927 2 Sheets-Sheet 1
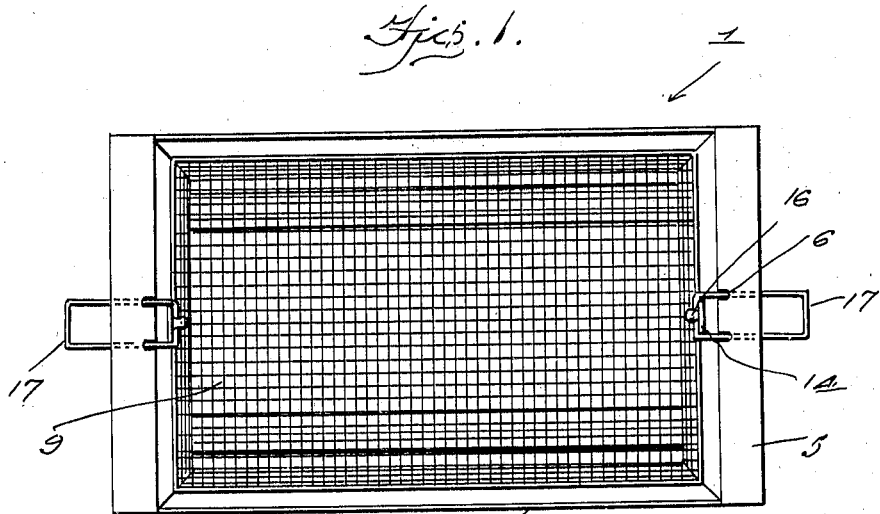
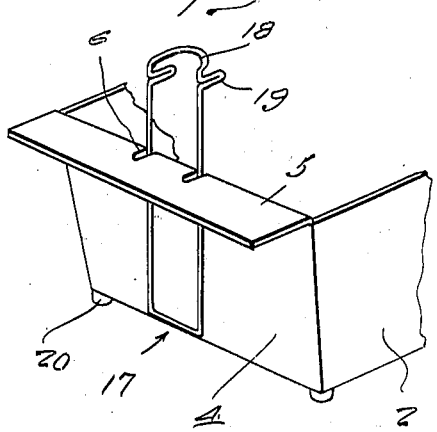
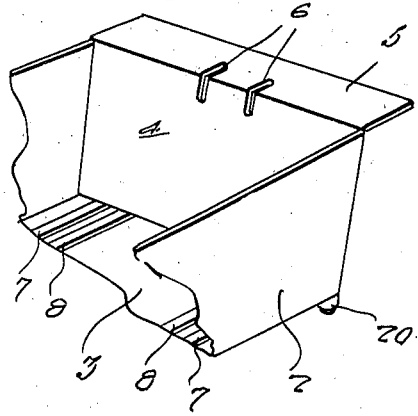
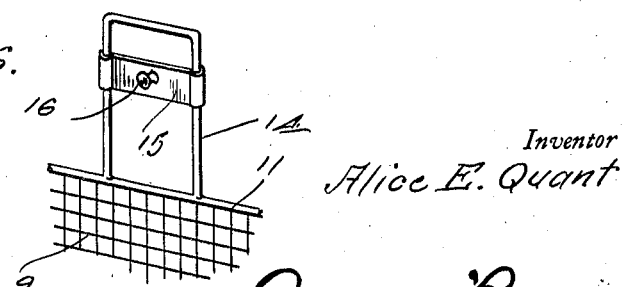
Inventor
Alice E. Quant
By Clarence A. O'Brien
Attorney Oct. 23, 1928.
A. E. QUANT
DISH WASHER
Filed Dec. 30, 1927
1,688,654
2 Sheets-Sheet 2
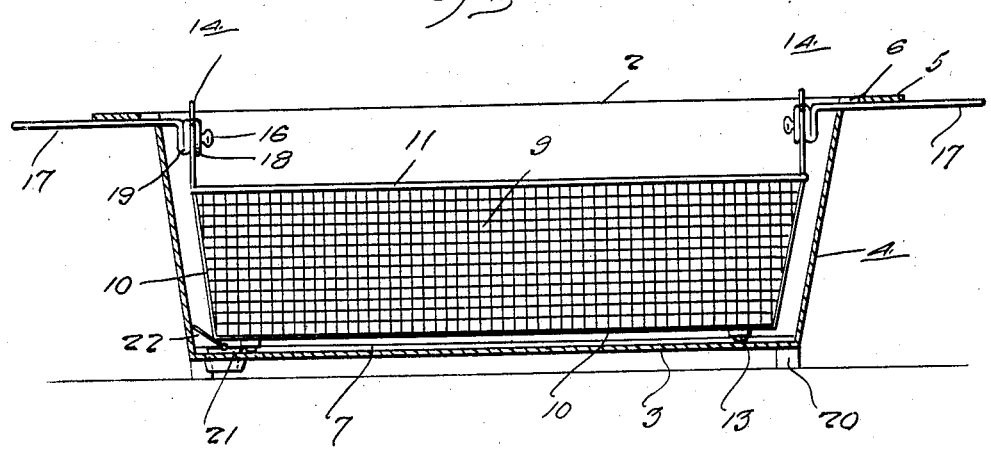
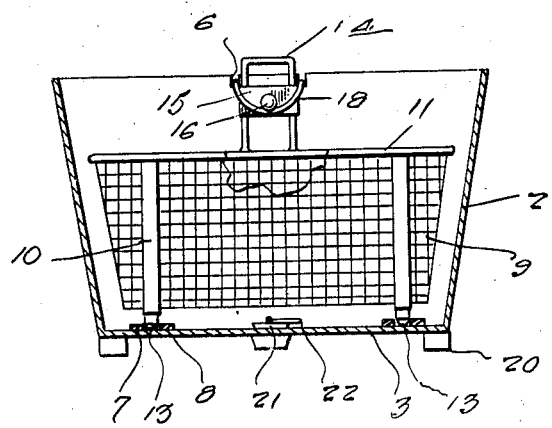
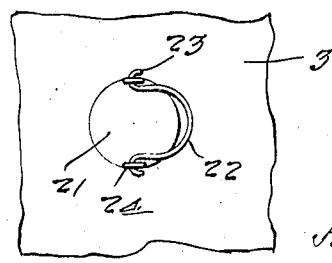
Inventor
Alice E. Quant
By Clarence A. O'Brien,
Attorney Patented Oct. 23, 1928.

1,688,654

UNITED STATES PATENT OFFICE.

ALICE EDNA QUANT, OF NEW LONDON, WISCONSIN.

DISHWASHER.

Application filed December 30, 1927. Serial No. 243,587.

The present invention relates to improvements in dish washers, and has reference more particularly to that class of dish washers that are adapted for household or domestic use.

One of the important objects of the present invention is to provide a dish washer which is of such construction as to facilitate the thorough and quick washing and draining of the dishes, and this being done without the necessity of the operator having to come in direct contact with the hot water within the tank or casing, thereby preventing any possibility of injury being sustained while using the dish washer.

A further object of the invention is to provide a dish washer of the above mentioned character which is simple in construction, inexpensive, strong and durable, and further well adapted to the purpose for which it is designed.

Other objects and advantages of the invention will become apparent during the course of the following description taken in connection with the accompanying drawings.

In the accompanying drawings forming part of this application and wherein like reference characters indicate like parts:

Figure 1 is a top plan view of the dish washer embodying my invention.

Figure 2 is a longitudinal sectional view through the imperforate casing or tank, showing the wire basket arranged within the tank and the manner in which the slidable and swingable handles that are associated with the respective ends of the casing are operatively connected with the handles at the respective ends of the wire basket for the purpose of effecting a slight reciprocatory movement to the basket while disposed within the tank or casing.

Figure 3 is a cross sectional view through the casing, for more clearly disclosing the tracks and the casters that cooperate therewith, and to further illustrate the manner in which the basket reciprocating means is arranged when in an operative position.

Figure 4 is a fragmentary detail perspective view of one end of the imperforate casing or tank showing the handle disposed vertically in the slots.

Figure 5 is a detail perspective view of one end of the imperforate casing or tank showing the laterally extending flange formed on the upper edge thereof and the slots formed therein.

Figure 6 is a detail perspective view of one of the upstanding handles associated with the wire basket, and Figure 7 is a top plan view of the plug that provides a closure for the drain opening formed in the bottom of the casing adjacent one end thereof.

In the drawings wherein for the purpose of illustration is shown the preferred embodiment of my invention, the numeral 1 designates generally my improved dish washer, the same comprising a substantially oblong shaped imperforate casing or tank 2, the side walls of which gradually converge toward the bottom 3 of the casing, the end walls 4 also gradually converging toward the bottom as clearly shown in the drawings. The top of the casing is open and a laterally extending flange or lip 5 is formed on the upper edge of each end wall 4 of the casing.

A pair of slots 6 is formed in the upper edge portion and the adjacent edge of the end walls and the laterally extending flanges respectively as is clearly shown in Figure 5 of the drawings, and the purpose of these slots will hereinafter be more fully described.

Two pairs of elongated flat strips 7 and 8, respectively, are secured on the upper face of the bottom 3 of the casing or tank 2 for the purpose of providing a pair of tracks adjacent the respective sides of the casing, and these tracks extend for substantially the full length of the bottom 3 as clearly shown in the drawings. The purpose of these tracks will also be hereinafter more fully described.

The invention further comprehends the provision of a perforate receptacle for containing the dishes that are to be washed and the numeral 9 denotes an open top wire basket, that is also of oblong shape, the sides and end walls gradually converging toward the bottom of the basket. This wire basket is smaller in size than the imperforate casing or tank 2, and is adapted to be removably disposed therein.

A pair of elongated straps 10 extend along the bottom of the basket adjacent the side edges thereof, the ends of the straps being disposed upwardly along the outer surfaces of the respective ends as clearly shown in Figures 2 and 3. The upper edge of the wire basket is reinforced in any appropriate manner as indicated at 11. Suitable casters 12 are secured on the portions of the straps 10 that extend along the bottom of the basket 9 and these casters are preferably arranged so as to be disposed adjacent the respective corners of the oblong shaped basket. The casters are adapted to be guided between the respective pairs of tracks 7 and 8 arranged on the upper face of the bottom 3 of the casing 2, and the manner in which the casters cooperate with the tracks is more clearly shown in Figure 3 of the drawings.

Substantially inverted U-shaped bails 14 extend upwardly from the upper edges of the respective ends of the wire basket 9, the bails being secured to the reinforcing wire 11 that extends around the upper edge of the wire basket so as to provide a rigid structure. The specific construction of the inverted U-shaped bail is more clearly shown in Figure 6 of the drawings.

A flat strip of metal 15 has its respective ends secured around the arms of each of the inverted U shaped bails and arranged on the inner face of the intermediate portion of each strip is the head member 16, the purpose of which will be presently apparent.

Also forming a salient part of the present invention is the handles associated with the end walls 4 of the imperforate casing or tank 2. Each handle which is generally designated by the numeral 17 is formed from a single piece of wire bent into substantially rectangular formation, one end portion of the rectangular frame-like structure of the handle being so bent as to form a yoke 18, and shoulders or stops 19 directly adjacent the yoke. The yoke 18 is furthermore disposed in parallel relation with respect to the shoulders or stops 19 and the arms or sides of the handles are adapted for slidable movement and also swinging movement within the respective slots formed therefor in the end walls and adjacent flanges.

Suitable buttons or the like 20 are secured to the bottom of the casing at the respective corners thereof for spacing the casing from the supporting surface. The bottom 3 of the casing is further formed with the drain opening adjacent one end thereof and this opening is normally closed by reason of the rubber or cork plug 21. A substantially U-shaped bail 22 has the free ends of the arms so bent as to form hooks 23 that engage upstanding eyes 24 arranged on the upper face of the plug 21 to provide a pivotal connection between the bail and the plug. This bail when in an upright position will permit the plug to be readily removed from the drain opening for obvious purposes.

The casing or tank 2 is filled with water and may be placed over a stove for heating the water. Normally the handles 17 are disposed in an upright position in the manner shown in Figure 4, and the yoke portions 18 provide a means whereby said handles may be grasped to lift the tank and carry the same from place to place. The basket 9 is filled with the dishes to be washed and the basket is inserted within the tank or casing 2 so that the casters 13 will be disposed between the respective pairs of strips 7 and 8 that constitute the tracks. As the basket 9 is of a smaller size than the tank, sufficient space is provided whereby the basket may be reciprocated within the casing for the purpose of thoroughly cleansing the dishes that are submerged below the surface of the water in the casing or tank.

After the basket has been properly positioned within the tank or casing, the handles 17 have their yoked ends swung downwardly in the vertical portions of the slots 6 so that this particular portion of each handle will be disposed over the adjacent bail 14 of the wire basket, and the yoke 18 will engage with the under side of the headed pin member 16 in the manner as clearly illustrated in Figure 3. The handle 17 will then be disposed in a horizontal position and the shoulders 19 will engage the outer sides of the cross strips 15 that carry the headed pins 16.

The handles will be disposed beneath the flanges 5 and the outer free ends of the handles will then enable the operator to reciprocate the basket 9 within the casing so that the dishes will be thoroughly cleansed and this will obviate the necessity of the operator having to come in direct contact with the hot water in the casing and thereby prevent any possibility of any injury being sustained when using the dish washer.

Any suitable implement may be employed to engage the bail 22 whereby to remove the plug 21 from the drain opening formed in the bottom 3 of the casing. After the dishes have been thoroughly cleansed, the handles 17 are disengaged from the respective bails 14, and are again disposed in a vertical position as shown in Figure 4 so that the bails 14 may be grasped to effect the upward lifting of the wire basket whereby to remove the basket from the casing or tank and simultaneously the dishes will be drained.

It will therefore be seen from the foregoing description that I have provided a dish washer that is particularly adapted for household or domestic use and due to its simplicity of construction, the same may be manufactured at a very low cost and will at all times be positive and efficient in carrying out the purposes for which it is designed.

While I have shown the preferred embodiment of my invention, it is to be understood that various changes in the size, shape and arrangement of parts may be resorted to without departing from the spirit of the invention and the scope of the appended claims.

Having thus described the invention, what I claim as new and desire to secure by Letters Patent is:—

1. In a dish washer, an imperforate casing that is open at its top, handles slidably and swingably associated with the respective ends of the casing at the upper edge portion thereof, a perforate dish receiving receptacle adapted to be removably disposed within the casing, said receptacle being smaller than the casing, bails extending from the ends of the receptacle, and means on the handles engageable with the adjacent bails for effecting the reciprocatory movement of the receptacle within the casing when said handles are disposed in one position.

2. In a dish washer, an imperforate casing that is open at its top, handles slidably and swingably associated with the respective ends of the casing at the upper edge portion thereof, a perforate dish receiving receptacle adapted to be removably disposed within the casing, said receptacle being smaller than the casing, bails extending from the ends of the receptacle, cooperating means between the handles and the adjacent bails for effecting the reciprocatory movement of the receptacle within the casing when said handles are disposed in one position, said last mentioned means comprisng a headed pin carried by each bail, and a yoke formed on the inner end of each handle for engagement with the respective headed pins.

In testimony whereof I affix my signature.

ALICE EDNA QUANT.